May 14, 1935.  W. G. KIRCHHOFF  2,001,026
DOUGH DIVIDER
Filed April 14, 1933   3 Sheets-Sheet 1
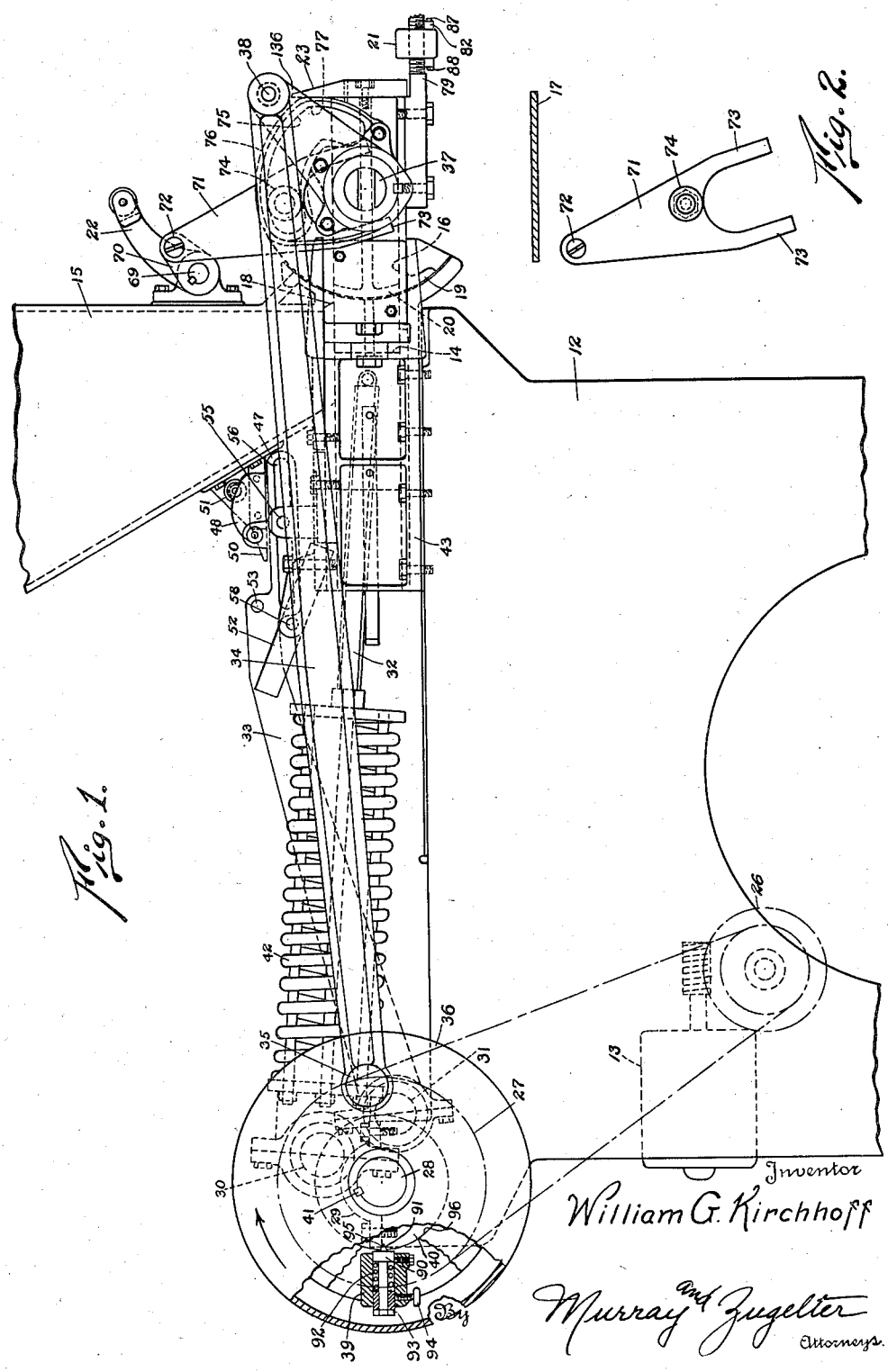

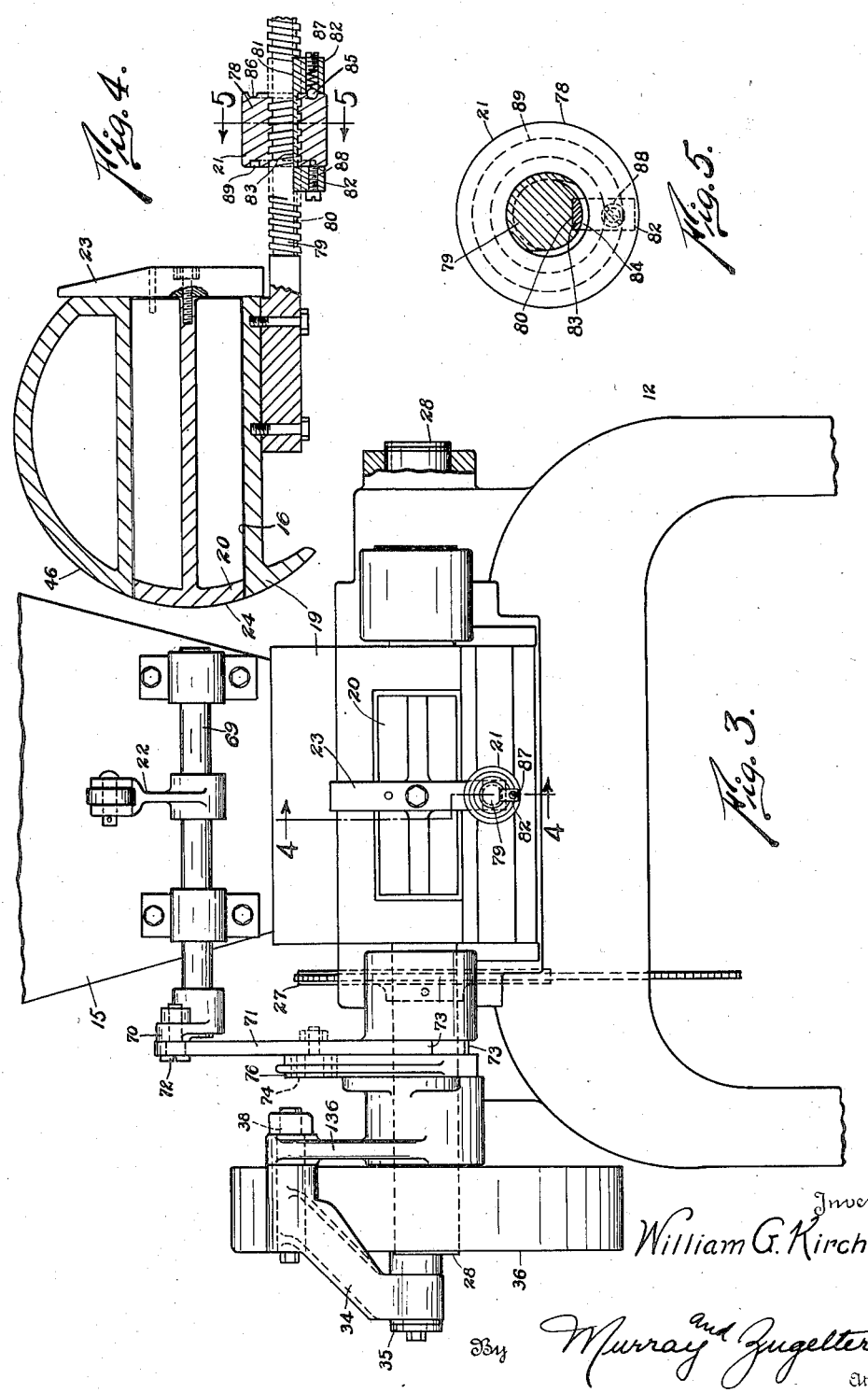

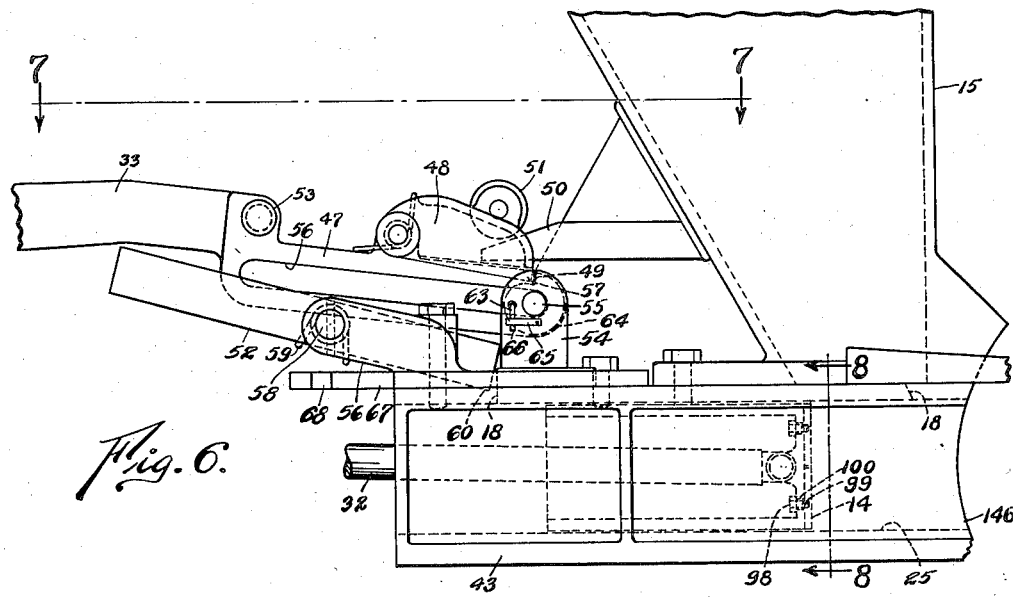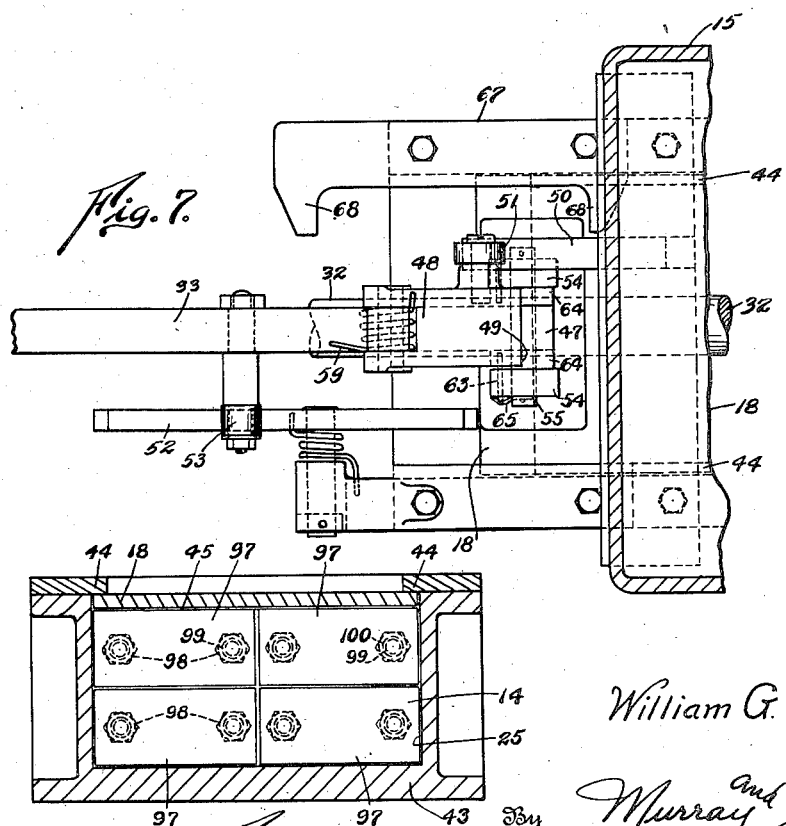

Patented May 14, 1935

2,001,026

UNITED STATES PATENT OFFICE 2,001,026

DOUGH DIVIDER

William G. Kirchhoff, Cincinnati, Ohio, assignor to The J. H. Day Company, Cincinnati, Ohio, a corporation of Ohio Application April 14, 1933, Serial No. 666,164

13 Claims. (Cl. 107—15)

This invention relates to new and useful improvements in a divider for dough or other plastics.

An object of the invention is to produce a divider for plastic masses which is extremely accurate, dependable, and smooth in its operation, and which has its various moving parts so arranged and designed as to reduce wear and breakage thereof.

Another object of the invention is to provide simplified yet very effective cut-off means for plastic dividing machinery.

A further object of the invention is to provide a novel and improved discharging means for plastic material divided or measured from a bulk mass.

Other objects are, to provide an improved means for adjusting or regulating the capacity of the measuring chamber; to provide a measuring plunger with means to compensate for wearing thereof; and to provide safety devices on the main shaft and the cut-off knife mechanism to preclude breakage of parts in the event that normal operation is interfered with by foreign objects or the improper adjustment of parts.

These and other objects are attained by the means described herein and disclosed in the accompanying drawings, in which:

Fig. 1 is a side elevational view of the improved divider, parts thereof being broken away.

Fig. 2 is a plan view of a cam follower member which forms a detail of the invention.

Fig. 3 is an end view of the machine of Fig. 1.

Fig. 4 is an enlarged cross-sectional view taken on line 4—4 of Fig. 3.

Fig. 5 is an enlarged cross-sectional view taken on line 5—5 of Fig. 4.

Fig. 6 is an enlarged fragmental view showing a cut-off mechanism of the invention and its relationship with a hopper and plunger means.

Fig. 7 is a cross-sectional view taken on line 7—7 of Fig. 6.

Fig. 8 is a fragmental cross-sectional view taken on line 8—8 of Fig. 6, showing the dough plunger in front elevation.

Fig. 9 is an elevational view of a safety element of the invention.

The machine of this invention is, in general, of the same nature as that disclosed in the patent of William G. Kirchhoff, No. 1,899,238, and includes various improvements over said prior machine. The present device includes a frame 12 that carries a motor 13 arranged to reciprocate a primary plunger 14 which advances dough or other plastic material from a hopper 15 into a measuring chamber 16 wherein the mass is divided or measured and is thereafter ejected downwardly onto a suitable table or conveyor 17 located below the measuring means. Upon each forward movement of the plunger 14, a quantity of dough is severed from the bulk mass within the hopper, by means of a cut-off plate or blade 18, which plate serves also as a baffle to preclude return of the severed plastic mass into the hopper when the plunger 14 is advanced. Advancement of said plunger toward the measuring chamber 16 of a rockable dividing drum or cylinder 19, causes the advanced mass to force inwardly a secondary plunger 20, whose inward movement is limited by an adjustable stop means indicated generally by the character 21. Upon filling of the measuring chamber to the extent permitted by the device 21, the drum or cylinder is moved through an arc of approximately ninety degrees, to a so-called discharging position, wherein the secondary plunger 20 assumes a position adjacent to and above the table or conveyor 17. An ejecting operation thereupon is performed, through the agency of an ejector element, which may be in the form of a rockably mounted arm 22, which descends and strikes the secondary plunger limit bar 23 so as to move it inwardly of the drum or cylinder and thereby dispose the secondary plunger 20 in an advanced discharging position. In this position, the secondary plunger has its outer convex face 24 in coinciding relationship with the arcuate formation of the drum exterior, as indicated in Figs. 1 and 4. After the discharging operation, the cut-off plate and the primary or power plunger 14 move rearwardly so that a new charge of plastic may be received in the plunger compartment 25 ahead of the main plunger 14.

As is most clearly illustrated in Figs. 1 and 3 of the drawings, the motor 13, through any suitable character of gear reduction mechanism 26, drives a sprocket 27 or the like which is securely fixed onto a main shaft 28 that is rotatably supported in a suitable bearing means 29 carried by the frame. The main shaft comprises a pair of cranks or other suitable eccentrics 30 and 31 which are employed to impart a proper reciprocating motion to the cut-off plate 18 and the dough advancing plunger 14. The plate and plunger just mentioned are connected with the cranks 31 and 30, respectively, by means of the main plunger rod 32 and the cut-off plate connecting rod 30. A third connecting rod, indicated at 34, and which will hereinafter be referred to as the pitman, has an eccentric mounting 35 upon a frictionally driven wheel 36, so that the pitman may impart a rocking movement to the dividing drum through the agency of a crank arm 136. The crank arm 136 is of course fixedly mounted upon the rocking shaft 37 of the drum 19, so that movement of the crank arm will be accompanied by a corresponding movement of the drum. The pivotal connection between the crank arm and the pitman is indicated at 38, and the device for transmitting power from the main shaft 28 to the large wheel 36 will be indicated for the present, by the character 39. The device 39 provides a frictional drive between a small drive wheel 40 and the larger wheel 36 which rides upon the circumference of said drive wheel 40, the latter being keyed or otherwise fixed to the main shaft as at 41.

The main plunger rod 32 with the familiar heavy coiled spring 42, in a known manner is adapted to yield slightly during the advancing movement of the plunger upon the severed dough mass.

With the understanding that the rockable drum 19 merely moves from the operative or receiving position shown in Fig. 1, to an inoperative or discharging position in which the plunger 28 and bar 23 are in a substantially vertical position, an explanation will now be given as to the main plunger 14 and the cut-off plate 18.

The plunger 14 is adapted to move within the chamber 25 which is formed in a sub-frame 43, and the cut-off plate 18 rests atop the plunger 14 for sliding relative movement, this plate being confined within the chamber 25 by means of suitable guides 44 (Fig. 8). It is to be observed that the plunger 14 is sufficiently long to provide an adequate upper bearing face 45 for proper sliding movement of the cut-off plate thereover. The reciprocating movement of the main plunger 14 is a simple back and forth movement between the limits of the bottom opening of the hopper, which communicates with the plunger chamber 25 when the plunger 14 is retracted in the manner indicated in Fig. 6. The plunger is arranged to advance to a point near the arcuate concave surface 146 of the sub-frame, which surface is always slidably contacting a complementary arcuate convex surface 46 of the rocking drum. The relationship of the cranks 30 and 31 to one another is such that the cut-off plate will close the bottom opening of the hopper just prior to the forward movement of the main plunger 14; and furthermore, means are provided in connection with the cut-off plate, for the purpose of precluding retracting of the cut-off plate prior to the retractile movement of the main plunger, the object being to prevent entry of plastic material between the working surfaces of the plunger, the cut-off plate, and its guides, and to induce the formation of a partial vacuum in the main plunger chamber during retraction of the main plunger, whereby to assist gravity in filling the main plunger chamber. In other words, there is provided a differential movement between the main plunger and the cut-off plate, which results from a mechanism presently to be described.

The mechanism for effecting the above mentioned differential movement between the plunger and the cut-off plate comprises an arrangement of slotted guide means 47, or lost motion connection, on the end of the connecting rod 33, a releasable plate advancing dog 48 which is pivoted upon the slotted end of the connecting rod, a dog engaging abutment 49 (Fig. 6) which is mounted for movement with the cut-off plate, a dog knock out means 50—51, a pivoted cut-off plate return check member 52, and a trip means 53 for said check member. It is to be understood that the brackets 54, which support the short shaft 55 carrying the dog engaging abutment 49, are fixedly secured to the substantially rectangular cut-off plate 18, and that said shaft 55 works always within the length of the elongated perforation 56 of the connecting rod end 47. Therefore, in the absence of an engaging relationship between the abutment 49 and the forward end of dog 48, there could be a reciprocating movement of the connecting rod without movement of the cut-off plate. However, in normal operation the nose 57 of the dog engages the abutment 49 of the cut-off plate assembly during the advancing movement, (toward the right), whereby to continuously advance the cut-off plate until a definite forward limit is reached (Fig. 1), at which the roller 51 climbs the inclined bar 50, and, being carried by the dog, the roller causes the nose of the dog to raise and leave the vicinity of the abutment. Thus, the advancing movement is terminated by the co-action of members 50 and 51. The member 50 is fixedly mounted upon any stationary part of the machine, for example the hopper 15. The roller or knock out element 51 may be rotatably supported upon the dog 48 or otherwise arranged to move it from abutting relationship with the abutment or tooth 49.

Upon disengagement of the dog as above described, the end of the connecting rod idly continues its advancement, i. e., without advancing the cut-off plate which has already reached its forward limit, (indicated in Fig. 1), while at the same time the main plunger 14 is steadily advancing to impact the severed plastic mass into the measuring chamber. Then, as the driving wheel 36 continues to rotate in the direction of the arrow thereon, the connecting rod 33 begins to retract its slotted end, but without retracting the cut-off plate, (see Fig. 1). The cut-off plate will not retract until the forward end of the slot 56 reaches and engages the short shaft 55 which works therein. Simultaneously with the retraction of the connecting rod, the dog will of course return to its operative position behind the abutment 49, in readiness for the next advancing movement of the cut-off plate.

Thus, the main plunger 14 and the cut-off plate do not always move in unison, but instead, the cut-off plate precedes the plunger in the advancing movement and follows it in the retracting movement.

In order that the cut-off plate may not be prematurely retracted by reason of its mere frictional contact with the plunger, there is provided a return check member 52 which may be in the form of a bar pivotally mounted upon a lug 57 of the frame, as at 58. The bar is normally tilted by means of a weight or a spring 59 so that its forward end 60 (Fig. 6) lies in the path of return movement of the cut-off plate, whereby to arrest any premature return movement thereof. A trip, which may be in the form of an extending stud carrying the roller 53, performs to remove the check member 52 from the obstructing position as the shaft 55 comes under the retracting influence of the extreme forward end 47 of the slot 56. The trip is carried by the connecting rod 33 and it strikes and moves the check bar, against the resistance of the spring 59, after the connecting rod begins its retractile movement and at approximately the same instant that the plunger 14 begins to retract.

It is desired to emphasize the fact that the lost-motion connection at 55—56 serves as a compensating means for overcoming the inharmonious movement that would otherwise occur between the plunger and the cut-off plate due to the offset disposition of their connecting rod cranks or eccentrics 30 and 31. The crank 31 is always "ahead of" the crank 30 (in view of the clockwise rotation of the main shaft) an amount approximating a quarter or a fifth rotation.

A safety means is provided for rendering the cut-off plate inactive in the event of its becoming jammed or bound for any reason, such as the dropping of a hard foreign object into the hopper and obstructing normal advancement of the cut-off plate. Said safety means may comprise one or more shear pins 63 which normally perform to maintain the abutment 49 in position to engage with the dog 48; however, upon shearing of said pin or pins, the rotatable plate or washer 64, in which the abutment is cut or formed, will be free to rotate about the short shaft 55 and thereby displace the abutment 49 so that the dog may not strike it for advancing the cut-off plate. As the result of the shearing of the pins, therefore, the dog necessarily reciprocates with the connecting rod 33 without preforming any work, and the cut-off plate accordingly remains idle. The shear pin, or each of them, extends through coinciding openings in the brackets 54 and washers 64, and may be removably held in position by means of small spring elements 65. Each spring element preferably engages a turned end 66 of a shear pin.

The character 67 indicates a limit member or stop plate the spaced extending lugs 68 of which are disposed in the path of movement of the cut-off plate for the purpose of precluding accidental displacement thereof in the event of loosening or breakage of any parts of the cut-off mechanism.

An explanation has been given stating the manner of effecting a rocking movement of the drum or measuring chamber member 19 by means of the pitman 34 and arm 36. Attention is now directed to the ejector mechanism for the measured mass in the measuring chamber 16. Said mechanism may comprise a contact arm or hammer such as 22 which is fixed upon a horizontal rock shaft 69 supported in suitable bearings on the hopper wall, and which shaft has fixed upon one of its ends a crank 70. The crank has a pivotal connection with a cam follower member 71, as at 72, which member preferably has a bifurcated end providing spaced parallel arms 73. These arms are adapted to straddle the rock shaft 37, as indicated in Fig. 1. Intermediate the ends of the member 71 is mounted a rotatable cam roller 74 which rides within the cam groove or way 75 of a cam 76 which is fixed relative to the drum 19. The cam groove is of substantially the same arcuate curvature throughout the major portion of its length, but at one end it has an abrupt turn inwardly, as at 77, in the general direction of the shaft. By means of the foregoing described character of cam, the contact arm 22 is caused to remain in the elevated position shown, until the drum rotates sufficiently to dispose the contact bar 23 substantially directly beneath the roller on the end of arm 22; at that time the cam roller enters the short inwardly directed portion of the cam way and thereby pulls downwardly the crank 70 and arm 22, whereupon the arm strikes the member 23 which effects an ejection of the dough mass within the measuring chamber.

Following the ejecting operation, the drum is rocked back to the dough receiving position of Fig. 1, and at the same time the cam mechanism acts to return the arm 22 to the elevated or inoperative position, whereupon the main plunger 14 may repeat its dough advancing function and thereby again fill the measuring chamber with dough. It will be understood, of course, that the dough upon entering the measuring chamber displaces the secondary plunger 20 and moves it inwardly as far as the adjusting means 21 will permit.

The adjusting means 21 may constitute an internally threaded nut member 78, the threads of which engage the threads of a post 79 which is fastened onto the drum in substantial parallelism with the major axis of the measuring chamber. The internal threads of the post are broken by a longitudinal keyway 80 which extends substantially the full length of the threaded portion of the post. The keyway is adapted to receive a key 81 having the following characteristics.

The key has spaced end lugs or extensions 82 formed thereon and intermediate which lugs is a reduced portion 83 just thick enough to permit the internal threads of the nut to ride over the curved face 84 thereof when in use, without interfering with the normal rotational and longitudinal movement of the nut. At one end of the nut there is provided a friction device which tends to bind the nut yieldingly to one of the lugs 82. As disclosed herein, the friction device may comprise a spring urged ball 85 supported within a longitudinally disposed bore of the lug, and said ball is adapted to ride upon a circular track, which conveniently may be in the form of a circular groove 86, provided on one end of the nut member. The frictional force of the ball upon the track may be varied by means of the set screw 87.

At the opposite end of the nut member there is preferably, though not necessarily, provided, a device for holding together the assembly 78—82 in the event of its removal from the threaded post. This device may be in the form of a dog point screw 88 whose inner end may freely ride within a circular groove or way 89 which is concentrically located at the nut end adjacent to the screw 88. Thus, the nut is always yieldingly restrained against accidental or inadvertent rotation due to the manner in which it is bound between the key lugs 82. The regulation of the distance between the bar 23 and the adjusting device 21 thereby determines the capacity of the measuring chamber, and, consequently, the size of the mass divided from the hopper mass.

Referring now to Fig. 1, a description of the safety device 39 will be given. This safety device consists mainly of a bored housing movable with one of the concentric wheels 36 or 40, it being shown attached to the wheel 39 in this instance. The bore of the housing contains a stem or plunger 90 having a tapered or rounded projection 91 on its outer face, and these parts are constantly urged forwardly or outwardly of the housing by means of a compression spring 92. The force of the spring may be regulated by means of a plug 93 or a screw which maintains the spring in abutment against the member 90. A suitable lock for the element 93 may be in the form of a transversely disposed thumb screw, set screw, or the like 94. As will readily be understood, the tapered or rounded projection 91 is received in a small depression 95 in the rim of wheel 40, so that upon forceful relative rotation of the wheels 40 and 36 the projection will leave the depression and permit substantially free relative rotation of those parts. Thus, any undue resistance offered to the rocking movement of the drum 19 will result in a disconnection of power between the driving wheel 40 and the frictionally driven wheel 36. It should be understood that the rim of the inner smaller wheel 40 rides within an enlarged opening 96 of the larger wheel, and in substantially the plane of the larger wheel.

In Fig. 8 is detailed the construction of the main plunger 14, which is provided with means for adjusting its size to compensate for wear. The adjusting means comprises a series of gib plates 97, preferably four in number, each of which is independently screwed or otherwise secured to the front or advancing face of the plunger body by means of the screws 98. As indicated more clearly in Fig. 6, the screws enter threaded bores 99 in each gib plate, from the rear of the front face of the plunger. The openings 100 of the plunger face are made sufficiently large in diameter to permit limited shifting of the gib plates relative to the plunger face, so that the effective area of the plunger front may be increased slightly upon wearing of the plunger or the walls of chamber 25. To adjust the fitting of the plunger within the chamber, it is therefore necessary only to loosen the screws 98, shift the gib plates outwardly, and then retighten the screws.

It is to be understood that the disclosure hereof is intended to set forth merely one form of an operative device, and that various modifications and changes in structural details may be made, within the scope of the appended claims, without departing from the spirit of the invention.

What is claimed is:

1. In a divider for plastic material the combination of a main shaft supported for constant unidirectional rotation, and means for applying power to said shaft, a pair of eccentrics movable always with the main shaft and offset relative to one another at a spacing of approximately a fifth of a circle arc, a hopper, a hollow housing providing a plunger chamber accessible through the hopper, a reciprocatory plunger working in the plunger chamber to advance plastic substance fed thereinto through the hopper, means for receiving the substance advanced by the plunger, a reciprocable cut-off plate located intermediate the plunger and the hopper, a connecting means associating the plunger with that eccentric which follows the other one during rotation of the main shaft in its given direction of rotation, and a second connecting means associating the cutoff plate with that eccentric which leads the other eccentric, said second connecting means comprising a connecting rod having an end abutment fixed and immovable relative to the connecting rod, and a pusher dog pivoted upon the connecting rod and movable relative to said fixed end abutment, an abutment movable with the cut-off plate and disposed for engagement with the dog, the abutment of the plate being so located relative thereto as to move through only part of the distance travelled by the connecting rod, a dog knock out element for terminating advancement of the plate by the dog prior to disposition of the dog to its forward limit of travel, and a member movable with the cut-off plate and disposed in the path of movement of the end abutment of the connecting rod, for retraction of the cut-off plate by said end abutment.

2. In a divider for plastic material the combination of a hopper and a hollow frame providing a plunger chamber accessible through the hopper, a reciprocating plunger working in the plunger chamber to advance plastic substance fed thereinto through the hopper, means for receiving the substance advanced by the plunger, a severing member and means including a lost motion connection for reciprocating said severing member between the hopper and the plunger chamber, said severing member being capable of considerable frictional association with the plunger and therefore capable of being influenced by the movement of the plunger, a check member operating normally to preclude retractile movement of the severing member by the plunger during a portion of the retractile movement of the plunger from the advanced position, means for disabling the check member at a predetermined time during said retractile movement, and a fracturable member associated with said lost motion connecting means to provide a limited idling movement for the severing member upon breakage of the fracturable member.

3. In a divider for plastic material the combination of a hopper and a hollow frame providing a plunger chamber accessible through the hopper, a reciprocating plunger working in the plunger chamber to advance plastic substance fed thereinto through the hopper, means for receiving the substance advanced by the plunger, a severing member and means including a lost motion connection for reciprocating said severing member between the hopper and the plunger chamber, said severing member being capable of considerable frictional association with the plunger and therefore capable of being influenced by the movement of the plunger, a check member operating normally to preclude movement of the severing member by the plunger during a portion of the retractile movement of the plunger from the advanced position, means for disabling the check member at a predetermined time during said retractile movement, a positive means for continuing the retraction of the severing member upon disabling of the check member, and a fracturable member associated with said lost motion connecting means to provide a limited idling movement for the severing member upon breakage of the fracturable member.

4. In a divider for plastic material the combination of a hopper and a hollow frame providing a plunger chamber accessible through the hopper, a reciprocating plunger working in the plunger chamber to advance plastic substance fed thereinto through the hopper, means for receiving the substance advanced by the plunger, a reciprocable cut-off plate located between the hopper and the plunger and capable of considerable frictional association with the plunger, a displaceable abutment movable with the cut-off plate, fracturable means for maintaining said abutment in an operative position, a reciprocating rod for actuating the plate, said rod including a lost motion connecting means associated with the plate to effect a retractile movement of the plate upon retraction of the reciprocating rod, a dog movable with the reciprocating rod and having a nose to engage with the abutment of the plate upon each advancing movement of the rod, whereby to advance the plate therewith, and a dog knock out means for disengaging the nose of the dog from the abutment upon predetermined advancement of the plate.

5. In a divider for plastic material the combination of a hopper and a hollow housing providing a plunger chamber accessible through the hopper, a reciprocating plunger working in the plunger chamber to advance plastic substance fed thereinto through the hopper, means for receiving the substance advanced by the plunger, a reciprocable cut-off plate located between the hopper and the plunger and capable of considerable frictional association with the plunger, an abutment movable with the cut-off plate and constituting part of a means for advancing said plate, a reciprocating rod for actuating the plate said rod including a lost motion connecting means associated with the plate to effect a limited retractile movement of the plate upon retraction of the reciprocating rod, a dog movable with the reciprocating rod and having a nose to normally engage the aforesaid abutment of the cut-off plate upon each advancing movement of the rod, whereby to advance the plate therewith, a dog knock out means for disengaging the nose of the dog from the abutment upon predetermined advancement of the plate, a check means for holding the cut-off plate in the advanced position during a portion of the retractile movement of the plunger, and means for disabling the check means at substantially the instant the lost motion connecting means performs to retract the cut-off plate.

6. In a divider for plastic material the combination of a hopper and a hollow frame providing a plunger chamber accessible through the hopper, a reciprocating plunger working in the plunger chamber to advance plastic substance fed thereinto through the hopper, means for receiving the substance advanced by the plunger, a reciprocable cut-off plate located between the hopper and the plunger and capable of considerable frictional association with the plunger, a displaceable abutment movable with the cut-off plate, fracturable means for maintaining said abutment in an operative position, a reciprocating rod for actuating the plate said rod including a lost motion connecting means associated with the plate to effect a retractile movement of the plate upon retraction of the reciprocating rod, a dog movable with the reciprocating rod and having a nose to engage with the abutment of the plate upon each advancing movement of the rod, whereby to advance the plate therewith, a dog knock out means for disengaging the nose of the dog from the abutment upon predetermined advancement of the plate, and a cut-off plate check member arranged to preclude retractile movement of the plate with the plunger, due to possible excessive friction therebetween, until positive movement of the plate is initiated at the lost motion connecting means.

7. In a dough divider, the combination a hollow housing providing a chamber for plastic substance, a plunger and means for reciprocating the plunger within the chamber, said plunger having a front plane face of an area slightly less than the cross sectional area of the chamber, a series of straight edged gib plates adjustably secured relative to the the front plane face so as to be shiftable outwardly to increase the area and the circumference of the front of the plunger, means for fixing said gib plates against shifting movement, a measuring chamber movable to receiving and discharging positions relative to the plunger chamber, and means for moving the measuring chamber to each of said positions.

8. As a new article of manufacture a substantially rectangular plunger for dough handling machinery said plunger having a front plane face, and a series of gib plates adjustably mounted relative to said front plane face so as to be shiftable outwardly to increase the area and the circumference of the front of the plunger, and means for fixing said plates in adjusted positions upon the front face.

9. As a new article of manufacture a plunger for material handling machinery said plunger having a front face provided with a series of enlarged perforations, a series of gib plates each of which has at least one internally threaded bore for coinciding with a perforation of the plunger face, and at least one threaded screw for each gib plate each screw having its threads engageable with a threaded bore of a plate and each screw being of sufficiently small diameter, relative to the diameters of the plunger perforations, to allow for outward shifting of the gib plates when the screws are loosened, whereby to increase the circumference and area of the plunger front.

10. A frictionally retained limit regulating means comprising in combination a threaded post having a longitudinal keyway formed therein, an internally threaded nut member adapted to be screwed onto the threaded post, a rigid inflexible key having ends at least one of which is bored longitudinally and an intermediate thin portion adapted to extend through the bore of the nut member longitudinally thereof and to rest within the keyway of the post, and means housed within the bore in the end of the key for effecting a frictional engagement of the key upon the nut member.

11. A frictionally retained limit regulating means comprising in combination a threaded post having a longitudinal keyway formed therein, an internally threaded nut member with unbroken threads adapted to be screwed onto the threaded post, a rigid inflexible key having enlarged ends and a thin intermediate portion adapted to extend through the bore of the nut member longitudinally thereof and to rest wholly within the keyway of the post so as not to interfere with rotation of the nut member upon the threaded post, a spring urged friction device carried by one enlarged end of the key, a track on the nut upon which the friction device may ride, means for regulating the force with which the friction device impinges upon said track and means associated with the other enlarged end of the key for holding the key to the nut member at all times.

12. As a new article of manufacture for material compressing machinery, a plunger having a rectangular front face provided with a series of enlarged perforations, a series of gib plates each of which has at least one internally threaded bore for coinciding with a perforation of the plunger face, and at least one straight outer edge, a threaded screw for each gib plate, each screw having a head for abutment upon the plunger and having its threads engageable with a threaded bore of a plate, each screw being of sufficiently small diameter relative to the diameters of the plunger perforations, to allow for outward shifting of the gib plates when the screws are loosened, whereby to increase the rectangular circumference and area of the plunger front.

13. In a divider for plastic material, the combination of a main shaft supported for constant unidirectional rotation, and means for applying power to said shaft, a pair of eccentrics movable always with the main shaft and offset relative to one another at a spacing of approximately a fifth of a circle arc, a hopper, a hollow housing providing a plunger chamber accessible through the hopper, a reciprocatory plunger working in the plunger chamber to advance plastic substance fed thereinto through the hopper, means for receiving the substance advanced by the plunger, a reciprocable cut-off plate located intermediate the plunger and the hopper, a connecting means associating the plunger with that eccentric which follows the other one during rotation of the main shaft in its given direction of rotation, a second connecting means associating the cut-off plate with that eccentric which leads the other eccentric, said second connecting means including a connecting rod having an end abutment fixed and immovable relative to the connecting rod, a pusher dog pivoted upon said connecting rod and movable relative to said fixed end abutment, a displaceable abutment member carried by the cut-off plate and positioned for engagement with the pusher dog, fracturable means for maintaining said movable abutment in the dog engaging position, said abutment of the plate being located so as to move through only part of the distance traveled by the connecting rod, a dog knock out element for terminating advancement of the plate by the dog prior to disposition of the dog to its forward limit of travel, and a member movable with the cut-off plate and disposed in the path of movement of said fixed end abutment of the connecting rod, for retraction of the cut-off plate by said end abutment.

WILLIAM G. KIRCHHOFF.